United States Patent Office 3,282,181
Patented Nov. 1, 1966

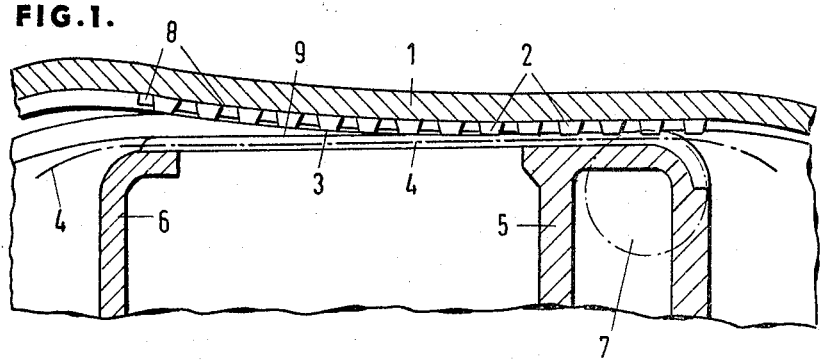
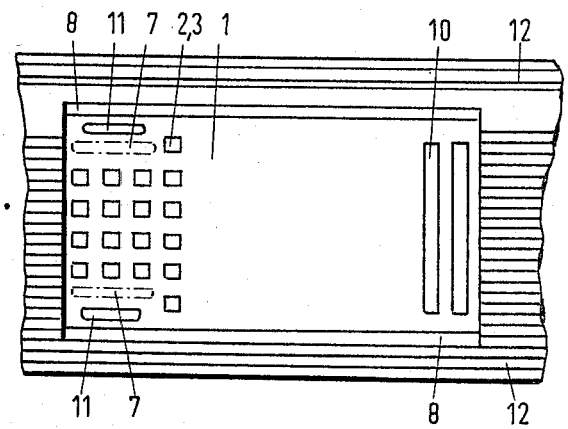
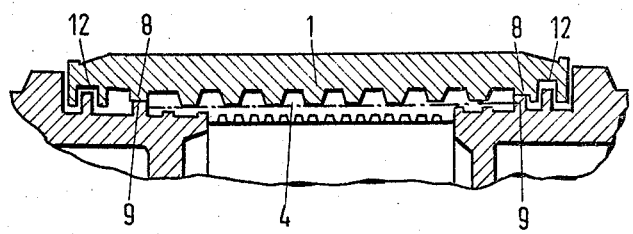

3,282,181
FILM CAMERA HOUSINGS
Karl Heinz Lange, Bunde-Ennigloh, Westphalia, Germany, assignor to Balda-Kamerawerk Rudolf Gruter, Kommanditgesellschaft, Westphalia, Germany, a German company
Filed Oct. 16, 1964, Ser. No. 404,382
Claims priority, application Germany, Oct. 19, 1963, B 73,939
10 Claims. (Cl. 95—11)

This invention relates to film camera housings.

The conventional practice in film cameras is to provide the rear closure wall of the camera with a pressure plate on the inside, such pressure plate usually being borne by a spring against the back wall, to obtain an exactly flat film exposure surface at the correct optical distance from the lenses. The construction of such a resilient pressure plate is relatively expensive.

The present invention relates to a construction which is very simple and yet gives an exact guide surface for the film. The invention is intended more particularly for plastic housings provided with a hinged rear closure wall but can equivalently be applied to metal housings and to plastic or metal housings in which the rear closure wall is not hinged but is secured in some other way, for example by stud engagement and pressure. A feature of the invention is that a pressure or guide surface is formed from projections on the rear closure wall and is inwardly convexly curved when open and unstressed so as to press on the body in a planar condition when closed. Flattening preferably takes place against a level edge rail of the camera body. The rear closure wall when hinged to the camera body, need gape only about 2 mm., for example, at the opening side.

With plastic constructions, the convex curvature is obtained naturally because during the cooling process in the manufacture of the camera back wall the outside shrinks more intensively than the guide side formed with the projections. The guide surface is advantageously not made as a unitary surface, but by means of transverse rails or block-like projections whose top faces form the guide surface.

Further details of the invention will be explained in detail with reference to the drawings, which illustrate one embodiment with modifications.

FIGURE 1 is a cross-section through the film guide channel of the camera in the longitudinal direction of the latter;

FIGURE 2 is a plan view of the inside of the camera rear wall according to FIGURE 1, but with the sides changed round, i.e., the left-hand side of FIGURE 1 is on the right in FIGURE 2, and vice-versa; and FIGURE 3 is a section transversely of the longitudinal direction of the camera in the region of the film guide channel.

With reference to the drawings, reference 1 illustrates to an enlarged scale the camera plastic rear closure wall which has a slight inward curvature in the non-stressed state, such curvature being somewhat exaggerated in FIGURE 1 in order to illustrate this feature more clearly. Block-like projections 2 are formed on the inside of the rear closure wall and when the camera is closed the top faces 3 of such blocks form the guide surface for the film 4. References 5 and 6 denote parts of the camera body, more particularly parts of the wall of the light well. Reference 7 is a transport wheel for the film 4.

Rails 8 are provided on the longitudinal sides of the film guide surface and are associated with matching rails 9 on the camera body. The camera hinge side (not shown in detail) is on the right in FIGURE 1 and on the left in FIGURE 2. FIGURE 1 shows the rear closure wall 1 in loose contact so that the left-hand part thereof gapes. If the left-hand side is pressed into the closed position a fastener (not shown) snaps home and the head faces 3 are situated exactly parallel to the film plane 4. Since the head faces 3 project further than the rails 8, the film 4 (see FIGURE 3) is satisfactorily enclosed on all sides and moves in a practically closed channel. The use of plastics for production enables very close tolerances to be observed. As shown in FIGURE 2 the blocks 2 can if necessary be replaced by transverse rails 10. The pressure plate is advantageously also provided with a short longitudinal rail 11 on the outside beside each transport wheel 7 so that the film is held in good engagement therewith. Light trap rails are provided at 12.

I claim:
1. A film camera housing comprising:
  (a) a camera body;
  (b) a rear closure wall for said camera body, said wall consisting of a flexible, resilient material, said wall being inwardly convexly curved when open and unstressed for pressing down on said body in a planar condition when closed; and
  (c) projections on the inner side of said wall providing an interrupted film guide surface.
2. A housing as claimed in claim 1, and comprising:
  (a) first rails on the longitudinal side edges of said guide surface; and
  (b) matching second rails on said camera body for cooperation with the said first rails, said projections being higher than said first rails, said first and said second rails forming a substantially closed channel as a film guide.
3. A film camera housing comprising:
  (a) a camera body;
  (b) a rear closure wall for said camera body, said wall consisting of a flexible, resilient material, said wall being inwardly convexly curved when open and unstressed for pressing down on said body in a planar condition when closed; and
  (c) block-like projections on the inner side of said wall providing an interrupted film guide surface.
4. A housing as claimed in claim 3, and comprising:
  (a) first rails on the longitudinal side edges of said guide surface; and
  (b) matching second rails on said camera body for cooperation with said first rails, said projections being higher than said first rails, said first and said second rails forming a substantially closed channel as a film guide.
5. A film camera housing comprising:
  (a) a camera body;
  (b) a rear closure wall for said camera body, said wall consisting of a flexible, resilient material, said wall being inwardly convexly curved when open and unstressed for pressing down on said body in a planar condition when closed; and
  (c) transverse rails on the inner side of said wall providing an interrupted film guide surface.
6. A housing as claimed in claim 5 and comprising:
  (a) first on the longitudinal side edges of said guide surface; and
  (b) matching second rails on said camera body for cooperation with said first rails, said transverse rails being higher than said first rails, said first and said second rails forming a substantially closed channel as a film guide.
7. A film camera housing comprising:
  (a) a camera body;
  (b) a rear closure wall for said camera body, said wall consisting of a flexible, resilient material, said wall being inwardly convexly curved when open and un- stressed for pressing down on said body in a planar condition when closed;
(c) block-like projections on the inner side of said wall providing an interrupted film guide surface;
(d) first rails on the longitudinal side edges of said guide surface;
(e) matching second rails on said camera body for cooperation with said first rails, said projections being higher than said first rails, said first and said second rails forming a substantially closed channel as a film guide;
(f) transport wheels for the film; and
(g) further longitudinal pressure rails providing part of said guide surface and being situated beside said wheels when said wall is closed.

8. A housing as claimed in claim 7, and said wall housing having hinges for connecting it to said body.

9. A film camera housing comprising:
(a) a camera body;
(b) a rear closure wall for said camera body, said wall consisting of a flexible, resilient material, said wall being inwardly convexly curved when open and unstressed for pressing down on said body in a planar condition when closed;
(c) transverse rails on the inner side of said wall providing an interrupted film guide surface;
(d) first rails on the longitudinal side edges of said guide surface;
(e) matching second rails on said camera body for cooperation with said first rails, said transverse rails being higher than said first rails, said first and said second rails forming a substantially closed channel as a film guide;
(f) transport wheels for the film; and
(g) further longitudinal pressure rails providing part of said guide surface and being situated beside said wheels when said wall is closed.

10. A housing as claimed in 9, and said wall having hinges for connecting it to said body.

References Cited by the Examiner
UNITED STATES PATENTS

| | | | |
|---|---|---|---|
| 1,905,454 | 4/1933 | Engelmann | 355—221 X |
| 1,957,904 | 5/1934 | Ord | 352—221 |
| 2,015,637 | 9/1935 | Hanna | 352—221 |
| 2,560,564 | 7/1951 | Foster | 352—221 |

JOHN M. HORAN, *Primary Examiner.*